(12) United States Patent
Chuang

(10) Patent No.: US 8,842,077 B2
(45) Date of Patent: Sep. 23, 2014

(54) TOUCH-CONTROL STRUCTURE FOR A FLEXIBLE DISPLAY DEVICE

(75) Inventor: Kai-Cheng Chuang, Tainan (TW)

(73) Assignee: E Ink Holdings Inc., Hsinchu County (TW)

( * ) Notice: Subject to any disclaimer, the term of this patent is extended or adjusted under 35 U.S.C. 154(b) by 558 days.

(21) Appl. No.: 12/406,561

(22) Filed: Mar. 18, 2009

(65) Prior Publication Data

US 2010/0171708 A1    Jul. 8, 2010

(30) Foreign Application Priority Data

Jan. 8, 2009 (TW) .............................. 98100458 A

(51) Int. Cl.
     *G06F 3/041*      (2006.01)
     *G06F 3/045*      (2006.01)

(52) U.S. Cl.
     CPC .............. *G06F 3/041* (2013.01); *G06F 3/0414* (2013.01); *G06F 3/045* (2013.01)
     USPC ........................................................ 345/173

(58) Field of Classification Search
     None
     See application file for complete search history.

(56) References Cited

U.S. PATENT DOCUMENTS

| | | | |
|---|---|---|---|
| 6,893,285 B1 | 5/2005 | Chiang | |
| 7,519,748 B2 * | 4/2009 | Kuzmin | 710/67 |
| 8,068,098 B2 * | 11/2011 | Yoshida | 345/173 |
| 2003/0213045 A1 | 11/2003 | Fuentes | |
| 2004/0008191 A1 * | 1/2004 | Poupyrev et al. | 345/184 |
| 2004/0070572 A1 * | 4/2004 | Nakajima | 345/173 |
| 2005/0099411 A1 * | 5/2005 | Van Brocklin et al. | 345/204 |
| 2006/0274036 A1 * | 12/2006 | Hioki et al. | 345/156 |
| 2007/0177094 A1 | 8/2007 | Van Dam et al. | |
| 2008/0259046 A1 * | 10/2008 | Carsanaro | 345/173 |
| 2009/0002336 A1 * | 1/2009 | Choi et al. | 345/174 |
| 2009/0058819 A1 * | 3/2009 | Gioscia et al. | 345/173 |
| 2010/0013777 A1 * | 1/2010 | Baudisch et al. | 345/173 |
| 2010/0018743 A1 | 1/2010 | Touwslager et al. | |
| 2010/0164888 A1 * | 7/2010 | Okumura et al. | 345/173 |
| 2011/0047460 A1 * | 2/2011 | Choe | 715/702 |

FOREIGN PATENT DOCUMENTS

| | | |
|---|---|---|
| EP | 1048972 | 11/2000 |
| JP | 2001066612 | 3/2001 |
| JP | 200446792 | 2/2004 |
| JP | 2007529777 | 10/2007 |
| TW | M257527 | 2/2005 |
| TW | 200813585 | 3/2008 |
| WO | WO0026887 | 5/2000 |

OTHER PUBLICATIONS

Japanese Office Action for Japanese Application No. 2009-02138, dated Feb. 4, 2014. English translation provided.

* cited by examiner

*Primary Examiner* — Joseph Haley
*Assistant Examiner* — Emily Frank
(74) *Attorney, Agent, or Firm* — Patterson Thuente Pedersen, P.A.

(57) ABSTRACT

A touch-control structure for a flexible display device is provided. The touch-control structure comprises a flexible display panel, at least one menu display area, a touch film and at least one sensing element. The flexible display panel comprises a visible surface. The menu display area is located on at least one side of the visible surface. The touch film comprises a first flexible substrate and an operating contact surface. The visible surface and the operating contact surface are disposed on the two opposite ends of the touch structure respectively. The sensing element is disposed on at least one side of the first flexible substrate corresponding to the menu display area.

9 Claims, 4 Drawing Sheets

TOUCH-CONTROL STRUCTURE FOR A FLEXIBLE DISPLAY DEVICE

This application claims the benefit of priority based on Taiwan Patent Application No. 098100458 filed on Jan. 8, 2009, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a touch-control structure. More particularly, the present invention relates to a touch-control structure for use in a flexible display device.

2. Descriptions of the Related Art

With the advancement of science and technology, display devices have become thinner and more lightweight to reduce the occupying space and weight. In the mean time, with the development of the user interface, the touch panel has become a very common input interface. However, as the display device becomes thinner, the thin profile provides relatively insufficient structural strength. In addition, the substrate of the conventional thin-profile display device, such as a liquid crystal display device, mainly consists of glass, which can be easily deformed with external forces and damaged accordingly.

To overcome the shortcoming of the conventional display devices, the development of flexible display devices has drawn much attention. The most common available flexible display technologies, such as electronic paper utilizing the electronic ink (E-ink) or organic light emitting diode display technologies utilizing the organic semiconductor, have realized the thin-profiled flexible display device to a certain extent. However, it is still difficult to apply a touch-control function to an existing flexible display device with these products.

The touch-control method that has been used in conventional display devices, such as resistive or capacitive touch-control technologies, has mainly been applied to hard substrates, such as a glass substrate. During the manufacturing process of forming the transparent conductive film on the substrate, the substrate has to be heated to a high processing temperature, so that the transparent conductive film can tightly adhere to the substrate. However, the excessive heat energy of this high temperature will damage the flexible substrate, which commonly utilizes organic plastic material, and further damage the touch-control function. On the contrary, forming the transparent conductive film with a relatively low processing temperature tends to degrade the conducting property and transparency of the transparent conductive film. Furthermore, it would be difficult for the transparent conductive film to adhere onto the substrate when formed with low temperature and would further cause the film to peel. As a result, it would be difficult to form the transparent conductive film of good quality on the flexible substrate, which in turn makes it difficult to raise the yield rate of the product utilizing the flexible substrate.

Furthermore, the touch-control film is disposed on the front side of the visible surface of a display device in the conventional touch-control display technologies. This arrangement will have the image brightness reduced due to the absorption by the touch-control film. In the touch-control display device with self-illumination, the brightness can be maintained by simply increasing the brightness of the light source. However, it would be difficult to overcome the problem when applying the touch-control film of the conventional arrangement to non-self-illuminating display technologies which utilize environmental light sources, such as electronic paper utilizing electronic-ink.

In view of this, it is important to provide a touch-control structure for a flexible display device which can maintain the brightness of the image.

SUMMARY OF THE INVENTION

The primary objective of this invention is to provide a touch-control structure for a flexible display device. The touch-control structure has a simple structure and manufacturing process, and will not degrade the image brightness of the flexible display device.

The touch-control structure comprises a flexible display panel, at least one menu display area, a touch film and at least one sensing element. The flexible display panel comprises a visible surface. The at least one menu display area is located on at least one side of the visible surface. The touch film comprises a first flexible substrate and an operating contact surface. The visible surface and the operating contact surface are disposed on the two opposite ends of the touch structure respectively. The at least one sensing element is disposed on at least one side of the first flexible substrate corresponding to the at least one menu display area.

In conclusion, the touch-control structure is advantageous due to its simple structure and manufacturing process. Furthermore, because the touch film of this invention is disposed on the back side of the visible surface, the image brightness of the flexible display device will not be degraded. Therefore, the touch-control structure of this invention overcomes disadvantages of the conventional touch-control technology, in which the touch film can only be applied on hard substrates and would degrade the image brightness.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
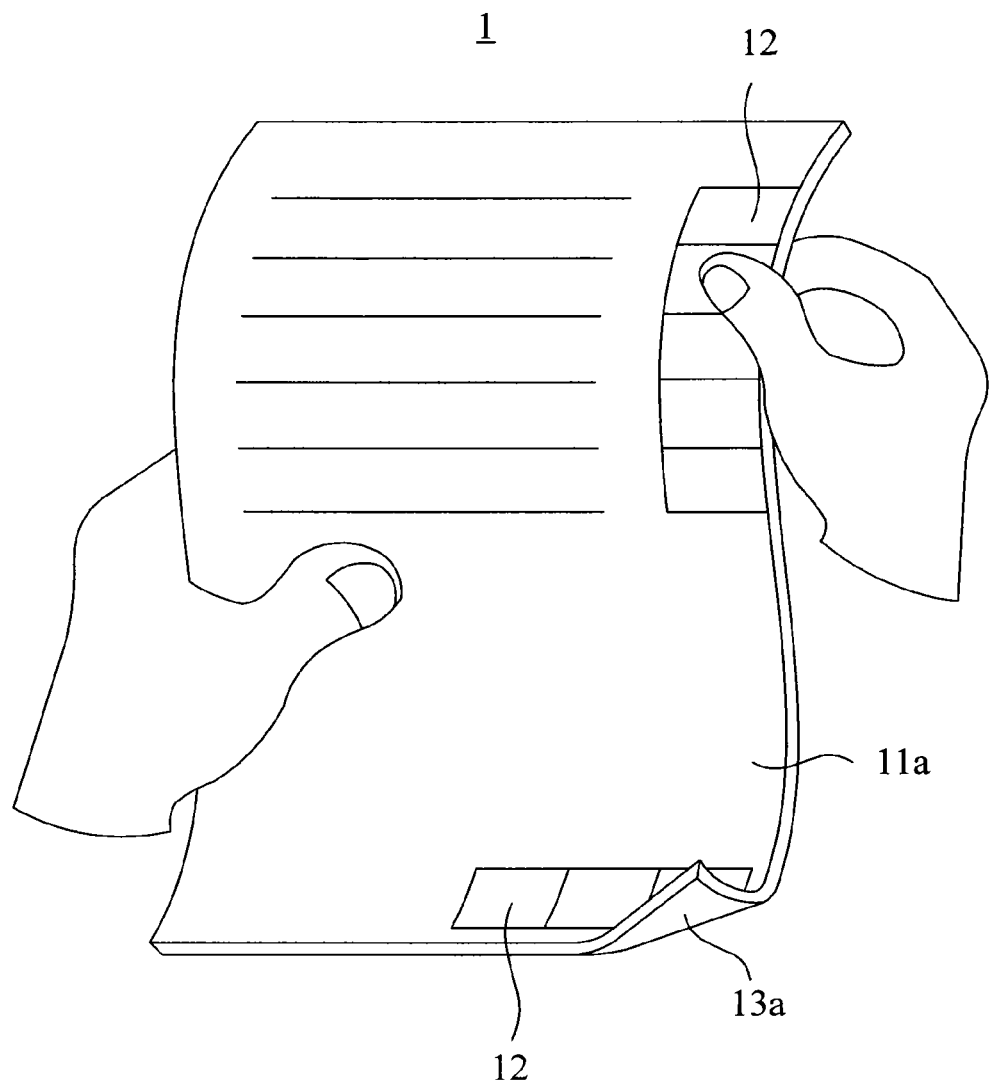
FIG. 1 is a schematic view of the touch-control flexible display device of the present invention.

In the following description, this invention will be explained with reference to embodiments thereof, which provide a touch-control structure for a flexible display device.

Descriptions of these embodiments are only for illustration rather than limitation. It should be appreciated that in the following embodiments and the attached drawings, elements indirectly related to this invention are omitted from depiction, and dimensional relationships among individual elements depicted in the drawings are only for facilitating the understanding of the invention rather than limiting the actual dimension.

FIG. 1 illustrates the flexible display device 1 which utilizes the touch-control structure of this invention. The flexible display device 1 can be held like a newspaper or book for the user to read and has a visible surface 11a, at least one menu display area 12, an operating contact surface 13a and a control module circuit 19. The menu display area 12 is located on at least one side of the visible surface 11a. FIG. 1 depicts a plurality of menu display areas 12, which are located on the right side and the bottom side of the visible surface 11a respectively. This invention does not tend to limit the menu display area 12 to a specific location on the visible surface 11a. More specifically, the menu display area 12 may also be located on the left side or top side of the visible surface 11a for the convenience of the user to perform a variety of operations under different viewing modes.

The visible surface 11a is adapted to display one or multiple pages of information. Meanwhile, the menu display areas 12 display menus of different functions, such as "previous page," "next page," "back to main menu" and "update". The user only has to clamp the menu display area 12 on the visible surface 11a and the place corresponding to the menu display area 12 on the operating contact surface 13a by the thumb and index fingers respectively with a small force to perform the corresponding function.

Figure 2A:
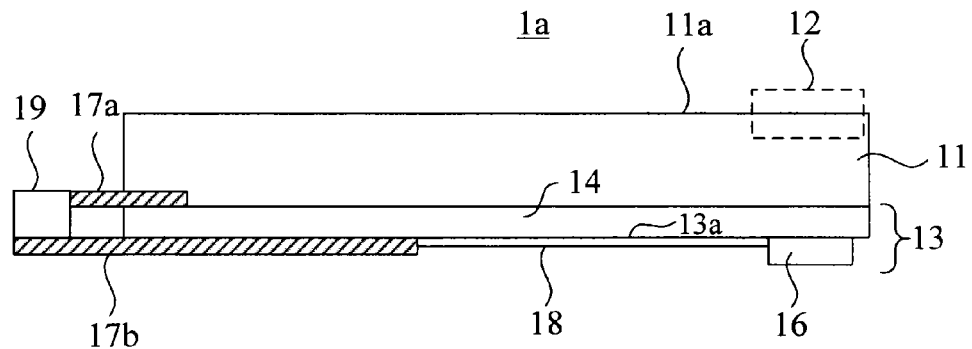
FIG. 2A is a schematic view of a first embodiment of the present invention.
Figure 2B:
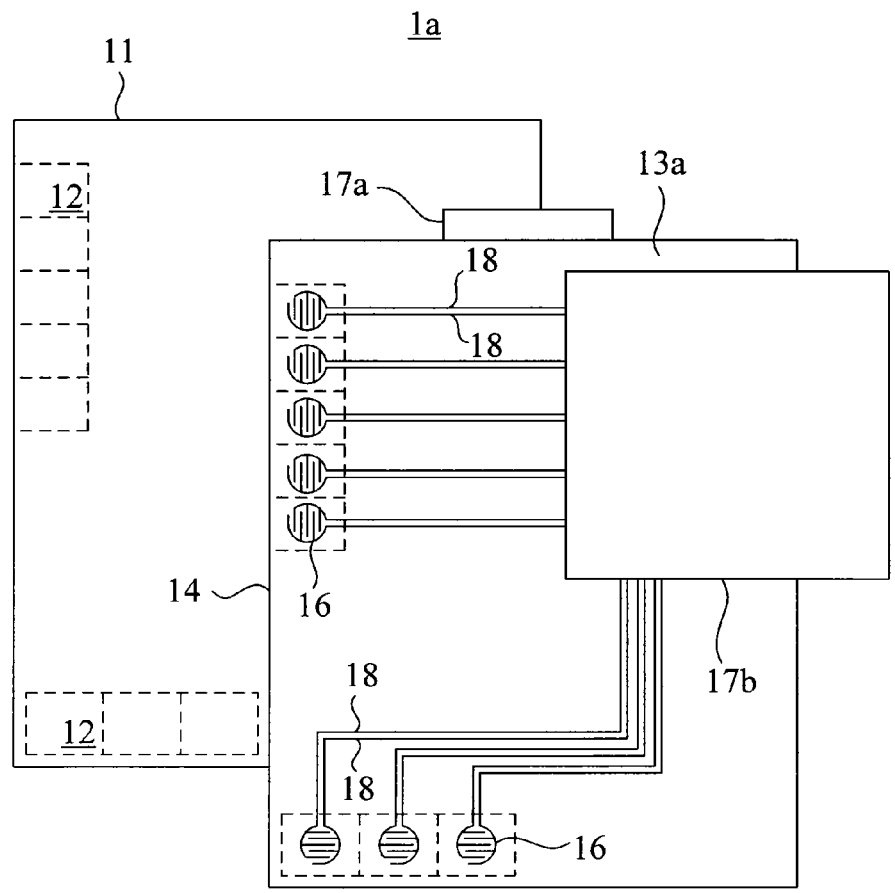
FIG. 2B is another schematic view of the first embodiment of the present invention.

FIGS. 2A and 2B illustrate the first embodiment of this invention, which is the touch-control structure 1a for the flexible display device 1. The touch-control structure 1a comprises a flexible display panel 11 and a touch film 13. The flexible display panel 11 may be a front plane laminate (FPL), an electrowetting display panel or other kinds of display panels with flexibility. The flexible display panel 11 has a visible surface 11a and a first flexible printed circuit (FPC) 17a. The flexible display panel 11 is electrically connected to the control module circuit 19 by the first flexible printed circuit 17a to receive the command from the control module circuit 19 and display various kinds of image on the visible surface 11a. The touch film 13 comprises a first flexible substrate 14 and the operating contact surface 13a as described in the previous paragraph. The touch film 13 is disposed on the back side of the flexible display panel 11 opposite to the visible surface 11a. With this arrangement, the visible surface 11a and the operating contact surface 13a are disposed on the two opposite ends of the touch-control structure 1a. In this embodiment, one side of the first flexible substrate 14 is configured to be the operating contact surface 13a of the touch film 13.

A plurality of sensing elements 16, a plurality of metal conducting lines 18 and a second flexible printed circuit 17b are disposed on the operating contact surface 13a of the first flexible substrate 14. The sensing elements 16 are respectively disposed corresponding to the menu display areas 12 on at least one side of the operating contact surface 13a. The sensing elements 16 are electrically connected to the second flexible printed circuit 17b by the metal conducting lines 18 and are adapted to generate the signal in response to the user's touch. The signal will then be transmitted to the control module circuit 19, which is connected to the second flexible printed circuit 17b, through the metal conducting lines 18 and the second flexible printed circuit 17b. In this embodiment, the sensing elements 16 are force sensors. As shown in FIG. 1, when the user clamps either of the menu display areas 12 by the thumb and index fingers with an adequate amount of force, the corresponding sensing element 16 will generate a signal in response to the pressure borne by the corresponding sensing element 16.

More specifically, the sensing element 16 is a force sensing resistor (FSR) which utilizes the piezoresistivity conductive polymer which changes resistance by force applied and is electrically connected to the second flexible printed circuit 17b by two metal conducting lines 18. The force sensing resistor has a great amount of internal resistance when there is no loading pressure. However, the internal resistance of a force sensing resistor is inversely proportional to the loading pressure, that is, the internal resistance decreases as the loading pressure increases. Therefore, in the absence of a user's press or with only slight touch on the sensing element 16, the sensing element 16 has a great amount of internal resistance that will keeps an open circuit between the two metal conducting lines 18 connected thereto. On the contrary, when the user exerts an adequate amount of pressing force on the sensing element 16, the internal resistance of the sensing element 16 decreases rapidly and a closed circuit between the two metal conducting lines 18 connected to the sensing element 16 is established. With this configuration, the sensing element 16 is adapted to generate and transmit a current, which is then served as a touching signal, between the sensing element 16 and the second flexible printed circuit 17b.

After the second flexible printed circuit 17b transmits the touching signal generated by either one of the sensing element 16 to the control module circuit 19, the control module circuit 19 may further determine and process the operation performed by the user. According to the various kinds of operation, the control module circuit 19 is adapted to send the corresponding refreshed information for the flexible display panel 11 to display. For example, when the user presses the menu display area 12 which presents the function of "previous page", the sensing element 16 corresponding thereto will send a signal to the control module circuit 19. The control module circuit 19 will then further determine the signal to be the function "previous page" performed by the user and switch the displayed content on the visible surface 11a of the flexible display device back to the content of previous page.

Figure 3A:
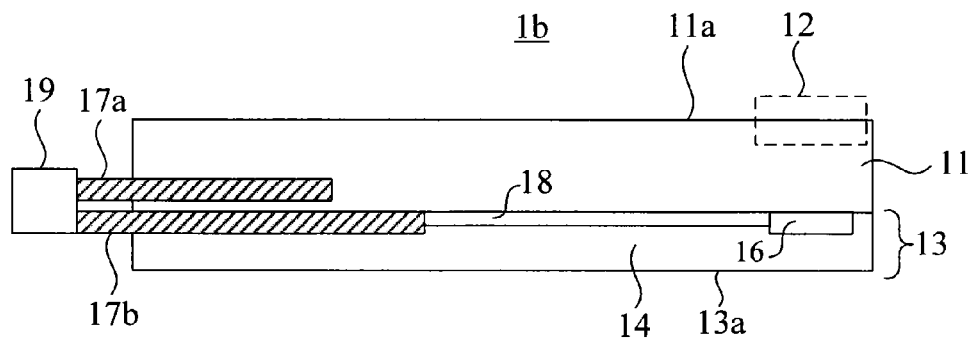
FIG. 3A is a schematic view of a second embodiment of the present invention.
Figure 3B:
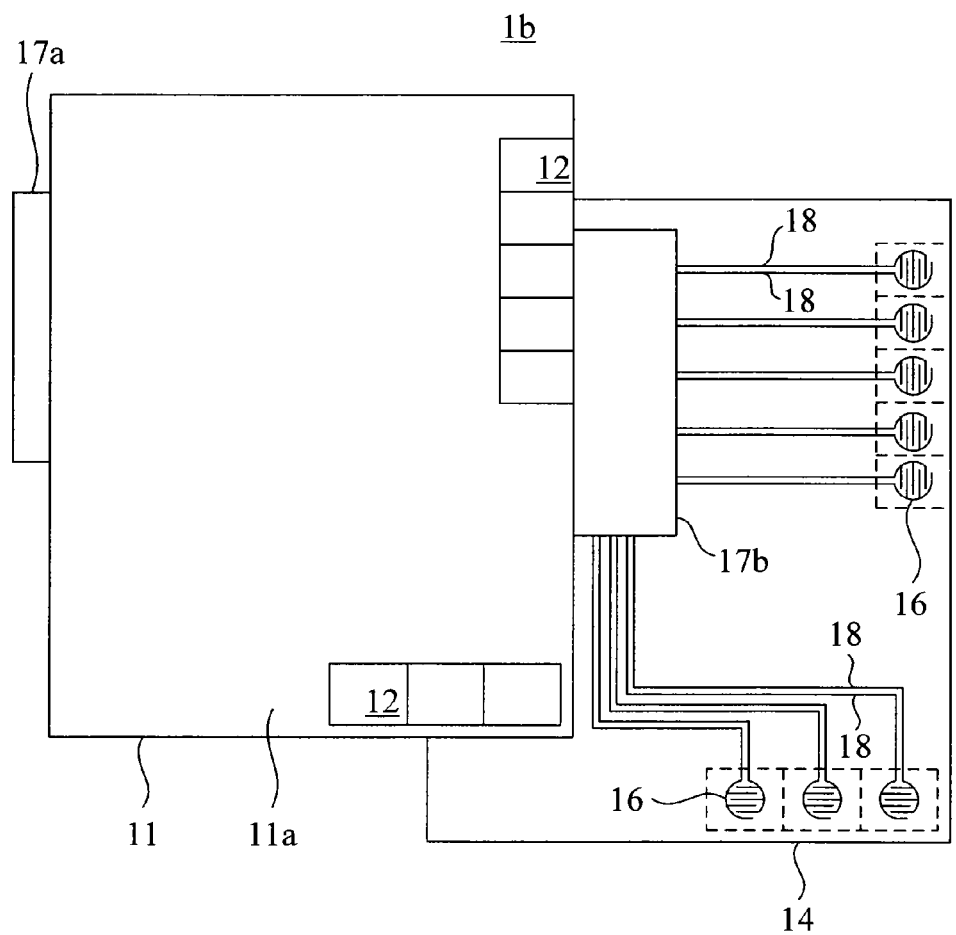
FIG. 3B is another schematic view of the second embodiment of the present invention.

FIGS. 3A and 3B illustrate the second embodiment of this invention, which is the touch-control structure 1b for the flexible display device 1. Similar to that of the first embodiment described previously, the touch-control structure 1b comprises a flexible display panel 11 and a touch film 13, while the flexible display panel 11 has a visible surface 11a and a first flexible printed circuit 17a. The flexible display panel 11 is electrically connected to the control module circuit 19 by the first flexible printed circuit 17a to receive the command from the control module circuit 19 and to display various kinds of images on the visible surface 11a. The touch film 13 is disposed on the back side of the flexible display panel 11 and has the first flexible substrate 14, an operating contact surface 13a located on the first flexible substrate 14 and a second flexible printed circuit 17b. The sensing elements 16 are disposed corresponding to the menu display areas 12 on at least one side of the first flexible substrate respectively and electrically connected to the second flexible printed circuit 17b by a plurality of metal conducting lines 18; meanwhile, the second flexible printed circuit 17b is electrically connected to the control module circuit 19.

Unlike the first embodiment, the sensing elements 16, the second flexible printed circuit 17b and the metal conducting lines 18 in this embodiment are clamped between the flexible display panel 11 and the first flexible substrate 14. Functions of other elements are the same as those in the first embodiment and therefore will not be further discussed in detail herein.

Figure 4A:
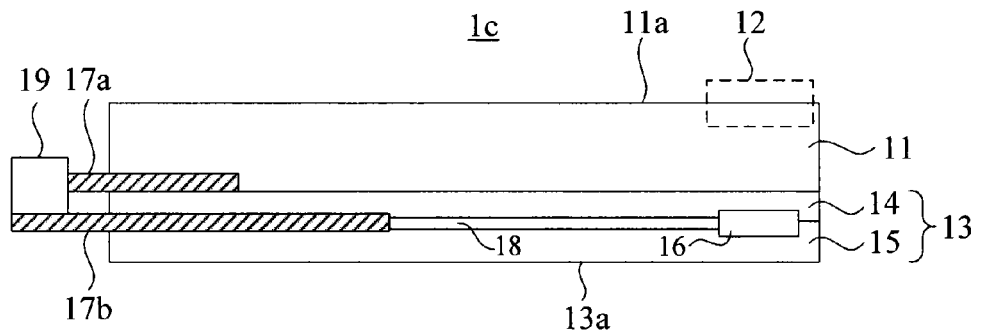
FIG. 4A is a schematic view of a third embodiment of the present invention.
Figure 4B:
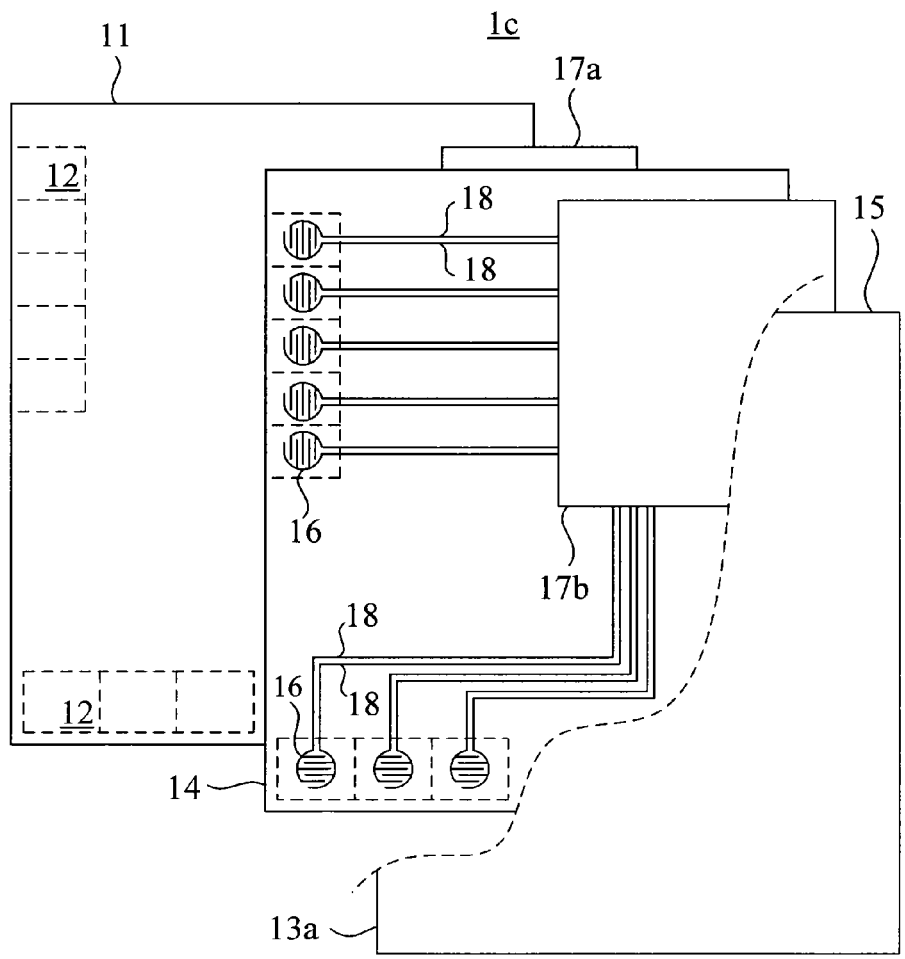
FIG. 4B is another schematic view of the third embodiment of the present invention.

FIGS. 4A and 4B illustrate a third embodiment of this invention, which is the touch-control structure 1c for the flexible display device 1. Similar to that of the first or second embodiment, the touch-control structure 1c comprises a flexible display panel 11 and a touch film 13, while the flexible display panel 11 comprises the visible surface 11a and a first flexible printed circuit 17a. The flexible display panel 11 is electrically connected to the control module circuit 19 by the first flexible printed circuit 17a to receive the command from the control module circuit 19 and to display various kinds of images on the visible surface 11a. The touch film 13 comprises the first flexible substrate 14, the second flexible substrate 15, an operating contact surface 13a and a second flexible printed circuit 17b. The first flexible substrate 14 is disposed between the flexible display panel 1 and the second flexible substrate 15. One side of the second flexible substrate 15 is the operating contact surface 13a. The sensing elements 16 are disposed correspondingly to the menu display areas 12 on at least one side of the first flexible substrate 14 respectively and electrically connected to the second flexible printed circuit 17b by a plurality metal conducting lines 18; meanwhile, the second flexible printed circuit 17b is electrically connected to the control module circuit 19.

Unlike the first embodiment, the sensing elements 16, the second flexible printed circuit 17b and the metal conducting lines 18 of this embodiment are clamped between the first flexible substrate 14 and the second flexible substrate 15. Functions of other elements are the same as those in the first embodiment and therefore will not be further discussed in detail herein.

In conclusion, the touch film of this invention is disposed on the back side of the visible surface, while the sensing elements are disposed correspondingly to the menu display areas on the touch film. With this arrangement, the touch-control structure is advantageous due to its simple structure and manufacturing process and does not degrade the image brightness of the flexible display device. Therefore, the touch-control structure of this invention prevents the shortcomings of the conventional touch-control technology, in which the touch film could only be applied on hard substrates and would degrade the image brightness.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A touch-control structure for a flexible display device, comprising:
    a flexible display panel having a visible surface;
    at least one menu display area being located on at least one side of the visible surface; and
    a touch film having a first flexible substrate and an operating contact surface and comprising at least one sensing element being disposed on the operating contact surface corresponding to the at least one menu display area, wherein the visible surface and the operating contact surface are disposed on two opposite ends of the touch structure respectively, wherein a clamping force applied to the menu display area on one side of the visible surface and at the same time to the sensing element on the operating contact surface of the flexible display causes the sensing element to generate a touching signal.

2. The touch-control structure as claimed in claim 1, wherein at least one side of the first flexible substrate is the operating contact surface.

3. The touch-control structure as claimed in claim 1, wherein the touch film further comprises:
    a second flexible substrate being configured to form a space with the first flexible substrate;
    wherein at least one side of the second flexible substrate is the operating contact surface, and the at least one sensing element is disposed inside the space.

4. The touch-control structure as claimed in claim 3, further comprising:
    at least one flexible printed circuit; and
    at least one metal conducting line, disposed inside the space, being configured to connect the at least one sensing element and the at least one flexible printed circuit.

5. The touch-control structure as claimed in claim 4, wherein the at least one sensing element generates a signal according to a touch, and the at least one metal conducting line is configured to transmit the signal to the at least one flexible printed circuit.

6. The touch-control structure as claimed in claim 1, wherein the at least one sensing element is a force sensor.

7. The touch-control structure as claimed in claim 1, wherein the at least one sensing element is a force sensing resistor.

8. The touch-control structure as claimed in claim 1, wherein the flexible display panel is a front plane laminate.

9. The touch-control structure as claimed in claim 1, wherein the flexible display panel is an electrowetting display.

* * * * *